United States Patent [19]

Koebel

[11] Patent Number: 5,065,076
[45] Date of Patent: Nov. 12, 1991

[54] DIGITAL CONVERGENCE SYSTEM

[75] Inventor: Alan Koebel, Kitchener, Canada

[73] Assignee: Electrohome Limited, Ontario, Canada

[21] Appl. No.: 600,262

[22] Filed: Oct. 22, 1990

Related U.S. Application Data

[63] Continuation of Ser. No. 461,394, Jan. 5, 1990, abandoned.

[51] Int. Cl.$^5$ .......................... H01J 29/70; H01J 29/76
[52] U.S. Cl. .................................................. 351/368 R
[58] Field of Search ........................................ 315/368

[56] References Cited

U.S. PATENT DOCUMENTS

| | | | |
|---|---|---|---|
| 4,305,022 | 12/1981 | Mitamura et al. | |
| 4,305,092 | 12/1981 | Katzfey | 358/60 |
| 4,400,719 | 8/1983 | Powers | 358/21 R |
| 4,422,019 | 12/1983 | Meyer | 315/368 |
| 4,456,923 | 6/1984 | Annegarn et al. | 358/64 |
| 4,482,919 | 11/1984 | Alston et al. | 358/152 |
| 4,524,379 | 6/1985 | Okada et al. | 358/11 |
| 4,549,117 | 10/1985 | Takahashi et al. | 315/371 |
| 4,633,294 | 12/1986 | Nadan | 358/11 |
| 4,672,275 | 6/1987 | Ando | |
| 4,757,239 | 7/1988 | Starkey | 315/371 |

FOREIGN PATENT DOCUMENTS 0291924 11/1988 European Pat. Off. .
60-130288 7/1985 Japan .

*Primary Examiner*—Theodore M. Blum
*Attorney, Agent, or Firm*—Fay, Sharpe, Beall, Fagan, Minnich & McKee

[57] ABSTRACT

In a digital convergence circuit within a video display system, an interpolation circuit for multiplying first and second predetermined correction values corresponding to a pair of sample points by a plurality of respective first and second weighting coefficient values corresponding to successive additional sample points (i) intermediate the first and second sample points. Circuitry is provided for detecting the number (N) of successive additional sample points (i) and in response generating a first address signal representative thereof. Further circuitry is provided for generating successive count address signals corresponding to the successive additional sample points (i). A memory is included for receiving the first and successive count address signals and in response generating respective ones of the first weighting coefficient values $a$ in accordance with the relation $a=i/N$. Additional circuitry is provided for receiving and inverting the respective ones of the first weighting coefficient values $a$ and in response generating respective ones of the second weighting coefficient values in accordance with the relation $1-a=1-i/N$.

19 Claims, 5 Drawing Sheets

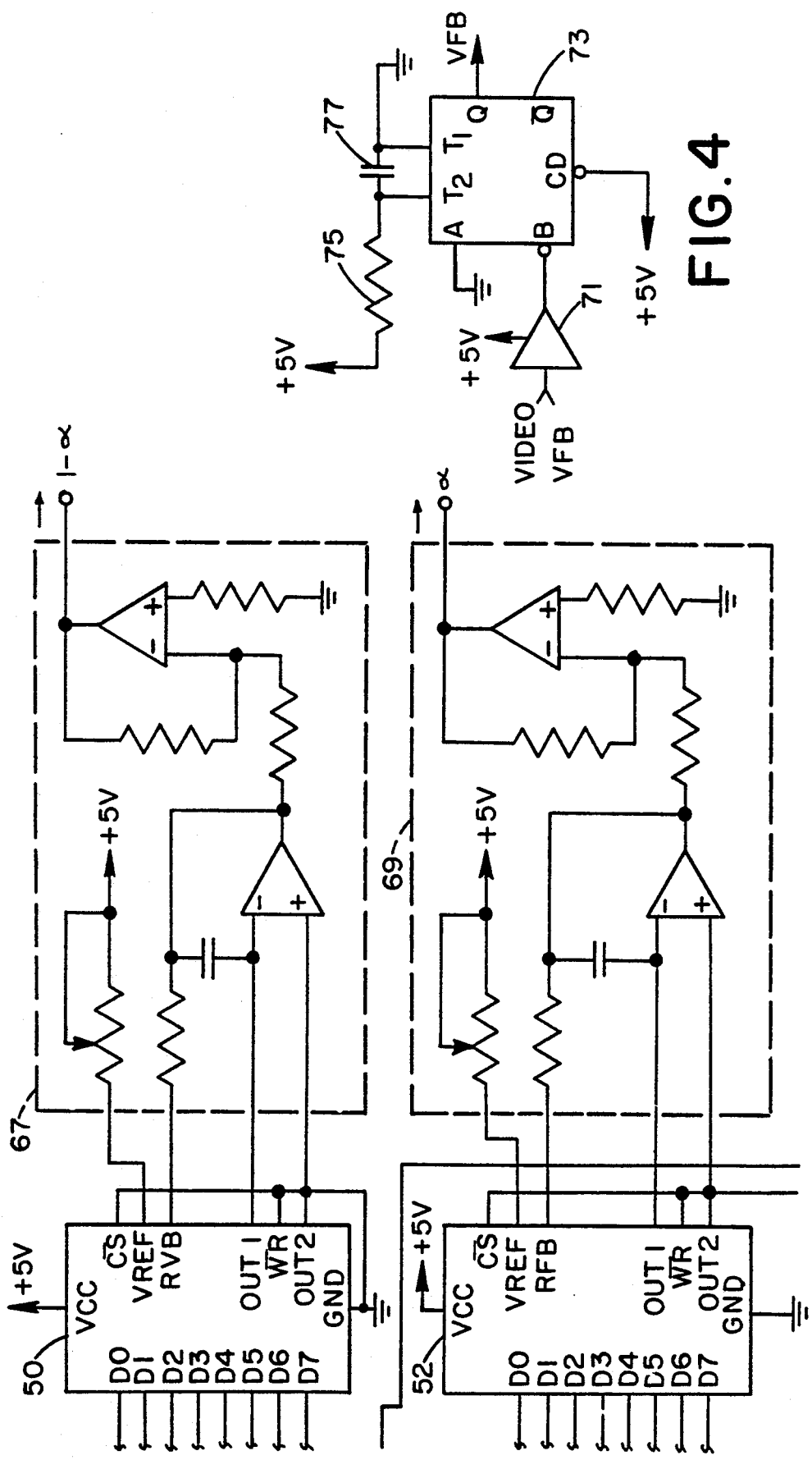

DIGITAL CONVERGENCE SYSTEM

This is a continuation of application Ser. No. 461,394, filed on Jan. 5, 1990, now abandoned.

The present invention relates in general to video systems, and more particularly to a digital convergence correction circuit for convergence correction of projected electron beams in projection video display systems.

Well known colour video projection systems are comprised of three colour electron guns (red, green and blue) for emitting three separate electron beams which are transmitted through respective CRT face plates having respective red, green and blue phosphor layers. The coloured beams emitted from the phosphor on the faceplate of each CRT are then focused together on a projection surface with varying intensities, for creating a composite colour image. Each of the electron beams is magnetically deflected via respective main deflection coils for directing the beams from left to right across the projection surface along a plurality of horizontal scan lines. The number of scan lines appearing on the projection surface for each image (raster) may vary in relation to the scanning frequency of the projection system.

Due to various magnetic influences and non-linearities in the projection system, each of the electron beams may bend more or less in relation to one another at the left and right and top and bottom extremities of the image on the projection surface.

It is known to use vertical and horizontal convergence coils for re-orienting the electron beams at predetermined locations within the image in order to effect proper registration of the three colours.

One prior art system includes circuitry for generating analog waveforms (e.g. parabolas, saw-tooth waves, etc.) and summing circuitry for adding the analog waveforms in various combinations and applying the summed waveforms to the convergence coils. This results in bending of the respective electron beams to a greater or lesser extent in relation to each other at various points within the image projection surface to compensate for the unwanted deflection due to magnetic and other non-linear influences. Such prior art analog convergence systems are difficult to use since manual correction of the registration at a particular point on the image projection surface typically influences the registration at other points, with the result that correcting the registration becomes a time-consuming operation. In many cases, the registration cannot be completely corrected for all areas within the image projection surface.

A second prior art convergence system utilizes circuitry for generating and adding only linear waveforms within a plurality of pre-designated "zones" of the image. This approach has been found to be easier to use since registration adjustment utilizing linear waveforms is intuitively simpler than using parabolic or combined parabolic and linear waveforms. However, this second prior art approach still suffers from the disadvantage that adjustment of the image in a particular zone typically influences the registration in one or more of the adjacent zones.

A digital convergence system has been developed in which horizontal and vertical adjustment values are retrieved from a digital memory and converted to analog form by means of a digital-to-analog converter DAC), the output of which is applied to the convergence coils for effecting fine tune adjustment of the electron beam deflection. The stored values correspond to a predetermined number of points arranged in a "grid" across the entire image surface. One such prior art digital system stores horizontal and vertical values sufficient to form a grid of 256 rows of 128 values.

One problem of this prior art digital convergence system is that it requires a large amount of memory (e.g. 32 K bytes RAM for each circuit, totalling 192 K bytes RAM for the entire system). This is not only expensive, but imposes a relatively long processing time interval since the internal microprocessor must calculate many points. A second problem associated with the prior art digital system is known in the art as "line pairing". At almost all scanning frequencies, the number of scan lines per frame does not form an exact multiple of the 256 vertical rows of correction values. This requires that some of the scan lines share convergence values, which results in discontinuities in the spacing of scan lines. Also, since typical prior art digital systems output 8-bit values for positioning a screen point to a predetermined desired accuracy, it has been found that a one-bit change in the correction value between two adjacent scan lines is very visible to the naked eye. The low resolution aspect of such prior art digital systems results in the distinctive and visually disconcerting effect known as "basket weaving".

In order to eliminate the line pairing problem, at least one row of correction values is required for each scan line in the image (raster). Furthermore, in order to reduce the "basket weaving" effect beyond the perception of the eye, at least 12-bit accuracy is required for each correction value. However, storing 12-bit values for (typically) 1024 scan lines per image would require 256 K bytes of memory for each colour (i.e. 1.5 megabytes of memory in total). This is not only impractical from a cost perspective, but is also impractical in terms of the microprocessor processing time required to calculate so many points.

An improved digital convergence system is described in U.S. Pat. No. 4,672,275 (Sony Corporation) which uses an interpolation circuit for deriving correction values for a predetermined proportion, e.g. every other line, of the screen scan lines between two neighbouring adjustment points on the basis of the correction data of such two adjustment points. The interpolation circuit transmits the resultant interpolated correction data to a digital-to-analog converter. The converter then transforms the digital signals to analog correction signals which are applied via a low-pass filter and output terminal to convergence correction coils.

Thus, in accordance with the Sony device, a much smaller amount of memory (e.g. less than 1K×8 bit RAM) is required for storing the convergence correction values than prior art digital convergence systems.

The interpolation circuit used in the Sony device is disclosed in greater detail in U.S. Pat. No. 4,305,022 (Sony Corporation). This latter Sony patent discloses a coefficient signal generating circuit, a multiplying circuit, and an adding circuit for producing scan line correction signals during scanning of a horizontal line other than one of the sampling lines for which correction values have been recorded. The circuit accomplishes this by linearly interpolating sampling line correction values received from memory on the basis of the vertical position of the scan line relative to the vertical position of the sampling lines to which sampling line correction signals correspond.

In operation, the memory used in the Sony interpolation circuit generates two correction values for each of the horizontal sampling positions scanned by the electronic beam in accordance with two address values. The first address value is the address of the corresponding horizontal sampling position on the highest number of sampling line which the electronic beam has started to scan within the current video field (i.e. zone), and the second supplied address value is the address of the corresponding horizontal sampling position on the next sampling line to be scanned by the electronic beam. Thus the first correction value (designated as U) corresponds to an upper sampling line, which is the sampling line at or immediately above the horizontal line currently being scanned, and the second correction value (designated as D) corresponds to a lower sampling line, which is the sampling line immediately below the horizontal line currently being scanned.

The coefficient signal generating circuit of Sony produces a 4-bit weighting coefficient Wu when the complementing pulse Cx is "0" or logic low during the time the upper sampling line correction value U is read from the memory. The coefficient signal generating circuit produces a weighting coefficient of Wd when the complementing signal Cx is "1" or logic high during the time that the lower sampling correction value D is read from memory. For each horizontal line scanned, the weighting coefficient Wd=1/16 of the value of the lower 4-bits of the horizontal line count contained within the line address signal generating circuit, and the weighting coefficient Wu=1−Wd. Successive correction values U and D are applied to the digital input of a digital-to-analog converter which in response generates corresponding analog voltages which are supplied to the multiplicand input of the aforementioned multiplying circuit. Synchronized therewith, the weighting coefficient values Wd and Wu are supplied to the multiplying circuit with the result that the multiplying circuit first generates an output voltage corresponding to Wu·U, and then generates an output voltage corresponding to Wd·D for each of the horizontal sampling positions scanned by the electron beam. These alternate weighted line sampling signals Wu·U and Wd·D are supplied to the input of the aforementioned adding circuit. As a result, the adding circuit generates a correction signal which corresponds fairly accurately to the horizontal correction value on each of 16 scan lines between the two sampling lines for which user correction values have been stored in the memory.

Although the Sony patents describe a form of correction circuit which performs vertical interpolation in hardware, the described circuit is frequency dependent and therefore suffers from the aforementioned problems of line pairing and "basket weaving" for frequencies of operation in which there are not exactly 16 scan lines between stored values. In particular, the Sony device can eliminate line pairing only at the expense of changing the number and the vertical spacing of the correction points on the screen with respect to frequency in order to maintain exactly 16 scan lines between user-defined adjustment points. On the other hand, in the event that the number of correction points and the spacing therebetween is kept the same regardless of frequency, the Sony system suffers from line pairing artifacts because some of the scan lines between user points are required to share correction values.

According to the present invention, an interpolation circuit is provided which interpolates a new correction value for every scan line between user-defined values, independently of frequency of operation. As a result, the interpolation circuit of the present invention eliminates line pairing artifacts while at the same time maintaining the positioning of the convergence correction points on the video screen independent of video input frequency. Moreover, the interpolation circuit of the present invention benefits from the cost and processing time reductions accruing from use of only a small memory (e.g. typically 2K×8 bit RAM or less) for storing the user-defined convergence adjustment points. Furthermore, according to another feature of the present invention, circuitry is provided for generating interpolated correction values with an accuracy greater than 12 bits, thereby overcoming the prior art problem of "basket weaving".

In accordance with one aspect of the present invention, there is provided in a scanning rate correction apparatus for generating interpolated correction values intermediate a pair of user-defined correction values associated with respective predetermined scan lines of a video display system, the improvement comprising:

(a) means for detecting the number (N) of successive scan lines (i) between said respective predetermined scan lines;

(b) means for generating a pair of weighting coefficients having values of $\alpha = i/N$ and $1-\alpha = 1-i/N$, respectively, for each said successive scan lines (i);

(c) first means for multiplying a first one of said pair of user-defined correction values by a first one of said pair of weighting coefficients ($\alpha$) for each said successive scan lines (i) and in response generating successive first product values;

(d) second means for multiplying the other of said pair of user-defined correction values by the other of said pair of weighting coefficients ($1-\alpha$) for each said successive scan lines (i), and in response generating successive second product values; and (e) means for summing said successive first and second product values and in response generating said interpolated correction values for each said successive scan lines (i).

In accordance with another aspect of the present invention, there is provided in a video display system including circuitry for generating a vertical timing pulse signal and a horizontal timing pulse signal, a digital convergence circuit comprising:

(a) vertical address generator means for receiving said vertical timing pulse signal and in response generating successive pairs of vertical address signals;

(b) horizontal address generator means for receiving said horizontal timing pulse signal and in response generating successive horizontal address signals;

(c) first memory means for receiving said successive pairs of vertical address signals and said successive horizontal address signals and in response generating successive pairs of user-defined convergence correction signals associated with respective horizontal adjustment points on predetermined scan lines of said video display system;

(d) means for detecting the number (N) of successive scan lines (i) between successive ones of said predetermined scan lines, and in response generating a further address signal representative thereof;

(e) further address generator means for generating successive count address signals representing said successive scan lines (i);

(f) second memory means for receiving said further address signal and said successive count address signals and in response generating successive pairs of weighting coefficient signals having values of $\alpha = i/N$ and $1 - = 1 - i/N$ respectively, for successive ones of said count address signals;

(g) first converter means for multiplying successive first ones of said pairs of user-defined convergence correction signals by respective first ones of said pairs of weighting coefficient signals ($\alpha$) and in response generating successive first product signals;

(h) second converter means for multiplying successive second ones of said pairs of user-defined convergence correction signals by respective second ones of said pairs of weighting coefficient signals ($1 - \alpha$) and in response generating successive second product signals; and (i) means for summing said successive first product signals with said successive second product signals and in response generating interpolated convergence correction signals for each said successive scan lines (i).

In accordance with yet another aspect of the present invention, there is provided in an interpolation circuit for multiplying first and second predetermined convergence correction values corresponding to a pair of sample points by a plurality of respective first and second weighting coefficient values corresponding to successive additional sample points (i) intermediate said first and second sample points, a circuit for generating said weighting coefficient values comprising:

(a) means for detecting the number (N) of said successive additional sample points (i), and in response generating a first address signal representative thereof;

(b) means for generating successive count address signals corresponding to said successive additional sample points (i);

(c) memory means for receiving said first and successive count address signals and in response generating respective ones of said first weighting coefficient values $\alpha$ in accordance with the relation $\alpha = i/N$; and (d) means for receiving and inverting said respective ones of said first weighting coefficient values and in response generating respective ones of said second weighting coefficient values in accordance with the relation $1 - \alpha 1 - i/N$, whereby a distinct convergence correction value is generated for each said sample points (i) intermediate said first and second sample points.

A preferred embodiment of the present invention will be described in greater detail below with reference to the following drawings, in which:

FIGS. 3a and 3b are schematic diagrams of circuitry for generating weighting coefficients in accordance with a preferred embodiment of the present invention; and FIG. 4 is a schematic diagram of circuitry for calibrating vertical timing pulse signals in accordance with a further aspect of the preferred embodiment.

Figure 1:
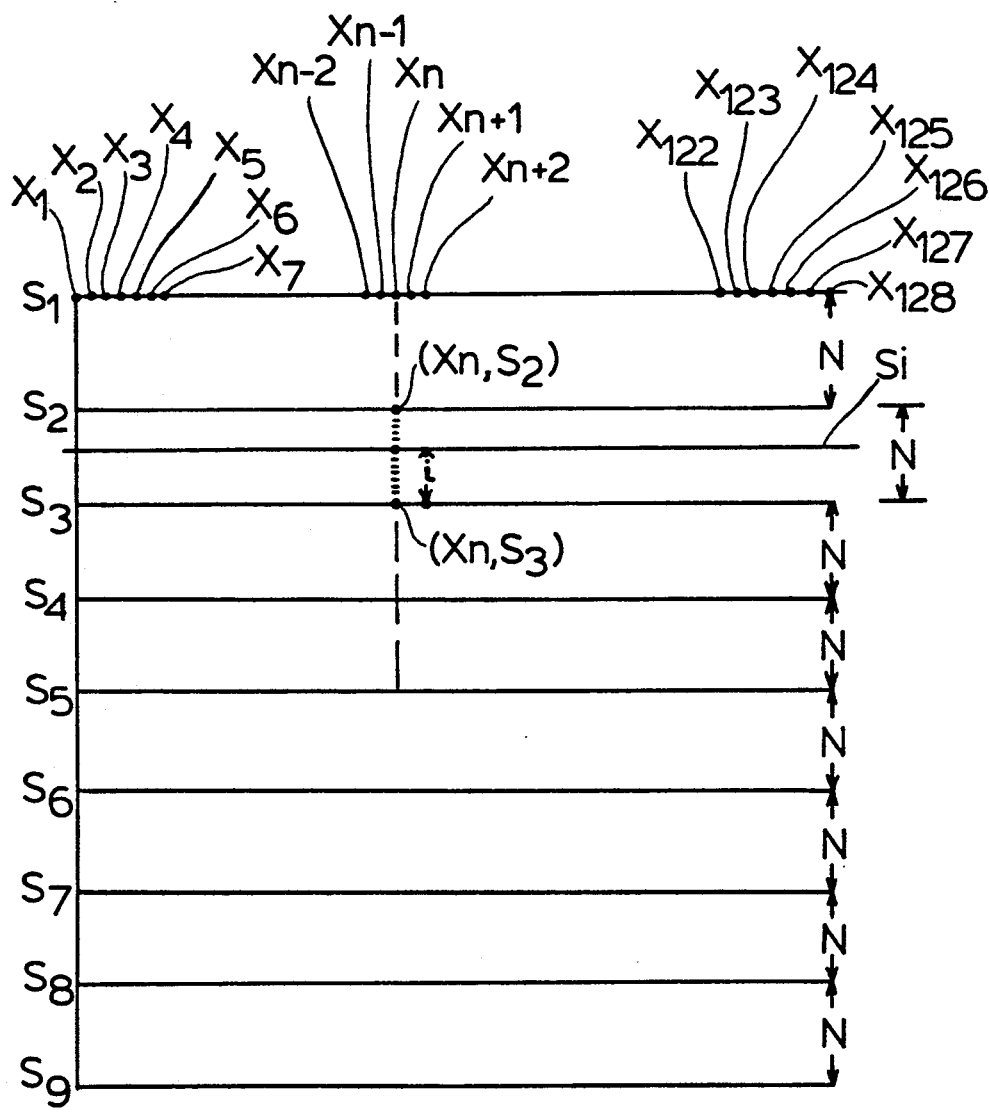
FIG. 1 is a diagram of a test image illustrating user-defined convergence correction points in accordance with the digital convergence system of the present invention.

Turning to FIG. 1, a convergence correction grid is shown for a digital video display system incorporating a plurality of user-defined correction points arranged in an array. In accordance with the illustrated embodiment, the grid is arranged in 9 rows ($S_1$–$S_9$) of 128 user-defined correction points ($X_1$–$X_{128}$) per row. Although not shown, in accordance with the principles of well known digital convergence correction systems, the user is provided with suitable input means (e.g. keypad) for individually adjusting each of the correction points to ensure proper convergence of the video image in all three colours (i.e. red, green and blue).

However, as discussed above, in order to eliminate line pairing artifacts, at least one row of correction values is required for each scan line in the image (raster). Furthermore, in order to reduce "basket weaving" beyond the perception of the eye at least 12-bit accuracy is required for the digital correction values.

Thus, in accordance with an essential aspect of the present invention, convergence correction values are interpolated in the vertical scan direction for each scan line.

As shown in FIG. 1, the total number of scan lines in the video raster is such that there are N scan lines between each row of user-defined adjustment points. In other words, N = total number of scan lines divided by 8.

As an example, consider the correction values at $X_n$, $S_2$ and $X_n$, $S_3$. There are N scan lines between rows $S_2$ and $S_3$. According to the present invention, the interpolated correction value at a given scan line $S_i$ is calculated a follows:

*Interpolated value* $= i/N(X_n, S_2) + (1 - i/N)\cdot(X_n, S_3) = \alpha\cdot(X_n, S_2) + (1 - \alpha)\cdot(X_n, S_3)$ where $\alpha = i/N$ represents a weighting coefficient.

Figure 2A:
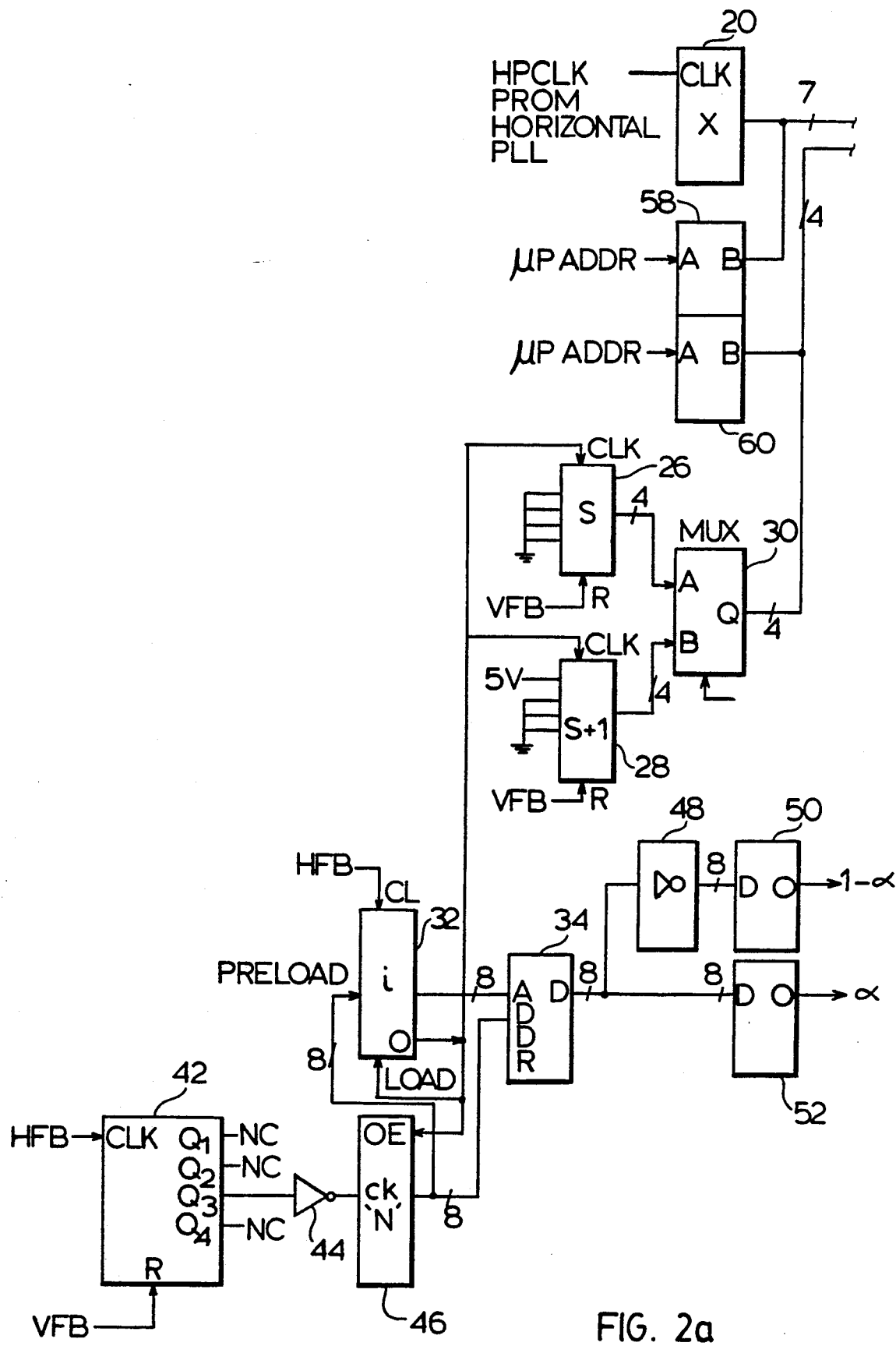
FIGS. 2a-2c are block schematic diagrams of a digital convergence system in accordance with the present invention.
Figure 2B:
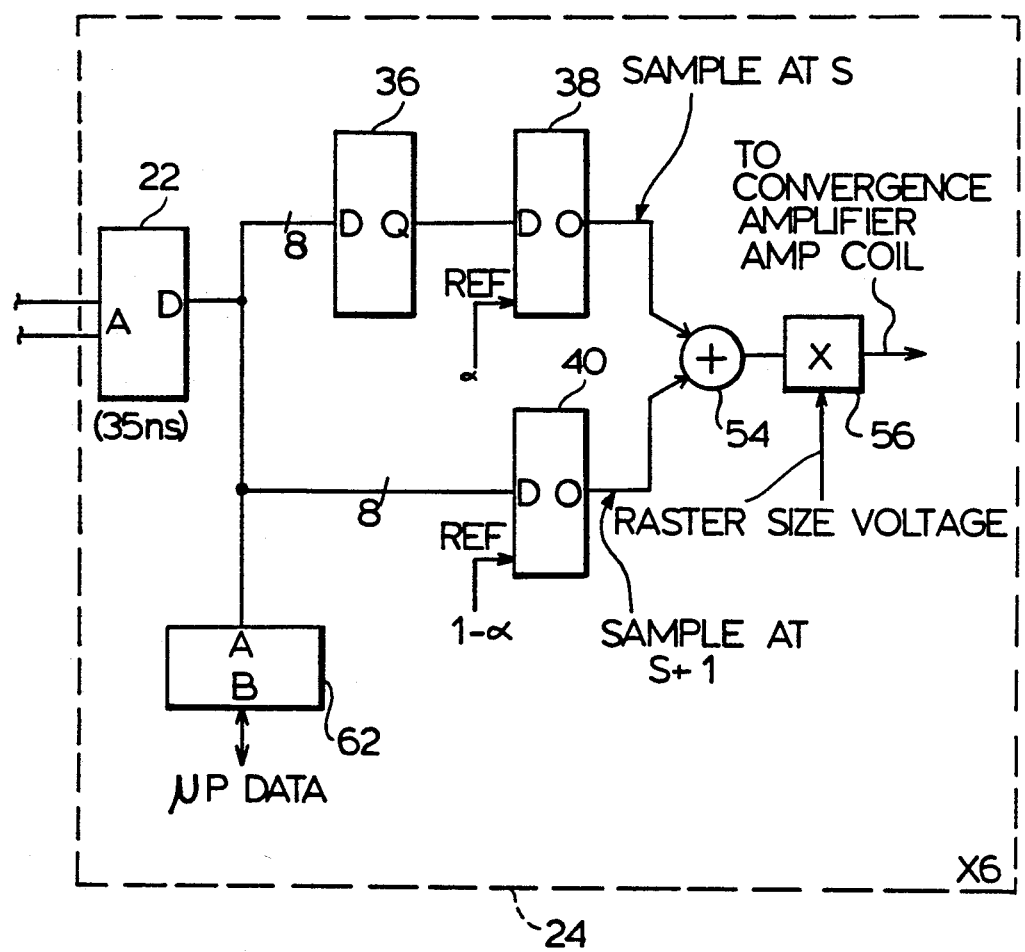
Figure 2C:
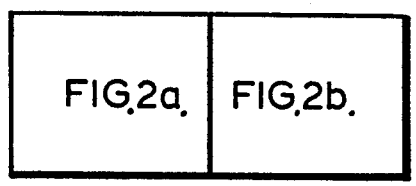

Turning to FIG. 2, the circuitry for generating $\alpha$ and the resultant convergence correction values is shown in its most general form.

The digital video display system forming the environment in which the circuit of the present invention operates typically includes well known horizontal phase locked loop circuitry for generating a horizontal clock signal HPLLCLK as well as horizontal and vertical fly-back pulse signals HFB and VFB respectively.

The HPLLCLK signal is received from the horizontal phase locked loop circuitry and applied to the clock input of a horizontal address counter 20 which in response generates a 7-bit address signal for addressing each correction memory circuit 22 of six interpolation circuits 24 for generating horizontal and vertical correction values for each of the red, green and blue electron beams of the digital video display system. Although six interpolation circuits are required, only one such circuit 24 is shown in FIG. 2 for ease of description.

Thus, counter 20 generates address signals for designating each of the horizontal convergence correction points $X_1$–$X_{128}$ shown in FIG. 1.

Further counters 26 and 28 in combination with multiplexer 30 form a vertical address generator for generating a 4-bit vertical address signal for identifying the respective grid scan lines $S_1$–$S_9$ (FIG. 1) accommodating the various horizontal correction points $X_1$–$X_{128}$.

The 4-bit address value output from the vertical address generator is combined with the 7-bit value output from the horizontal address counter 20 for addressing the correction value memory 22. In accordance with the embodiment shown, the correction value memory 22 is in the form of a fast (35 nS) CMOS static RAM configured as 2K×8 bits.

Counter 32 receives the HFB signal on a clock input thereof and in response generates address signals for addressing a coefficient memory 34 as discussed in greater detail below. A further output of counter 32 generates a clock signal corresponding to the HFB pulse for clocking counters 26 and 28.

As discussed above, for each horizontal address (e.g. Xn) two correction values are required from adjacent vertical scan lines (e.g. $S_2$ and $S_3$) in order to calculate an interpolated correction value for each scan line between the respective vertical scan lines. Thus, in accordance with the circuit of FIG. 2, counter 26 is initially preset to zero upon receipt of each vertical fly-back pulse VFB whereas counter 28 is preset to logic 1 upon receipt of the VFB signal.

Accordingly, counters 26 and 28 generate a pair of 4-bit vertical address signals, the address signal output from counter 28 being offset from the signal output from counter 26 by a value of logic 1. Multiplexer 30 selects the address signal from counter 26 during a first half of the HPLLCLK signal and selects the output signal from counter 28 during the latter half of the HPLLCLK signal.

Thus, for each horizontal address identified by counter 20, a pair of correction values (e.g. Xn, $S_2$ and Xn, $S_3$) are generated by correction memory 22. The first correction value (e.g. Xn, $S_2$) is stored in a latch circuit 36 and thereafter applied to the data input of a digital-to-analog converter 38 simultaneously with the latter correction value (e.g. Xn, $S_3$) being applied to the data input of another digital-to-analog converter 40.

As discussed above, a key aspect to the present invention relates to generation of weighting coefficient values $\alpha$ and $1-\alpha$ for each scan line of the raster.

To this end, a counter 42 is reset by the VFB pulse for each raster and clocked by the HFB signal for generating a further clock signal on the Q3 output thereof which is applied via inverter 44 to the clock input of an additional counter 46. Counter 42 effectively generates a clock signal of the form HFB divided by 8 for clocking counter 46. Thus, counter 46 counts every 8 scan line in a full raster. As discussed above, this count is equivalent to the number of scan lines N between successive ones of the scan lines $S_1$ to $S_9$ for which user-defined correction values are stored in the memory 22.

Counter 32 is pre-loaded with the count value N and decremented upon receipt of the HFB pulses on the clock input thereof. Accordingly, counter 32 generates a series of address signals (i) corresponding to each scan line between successive ones of the scan lines $S_1$ to $S_9$.

The address signals "i" and "N" are applied to address inputs of EPROM 34 as discussed above. The number of user input i.e. stored) rows of correction values $S_1$ to $S_9$ is assumed to be such that $N \leq 256$, (i.e. accommodating up to 2048 lines per raster). Since $N \leq 256$, a 64K byte EPROM 34 can be used to store 256 $\alpha$ values for each of up to 256 scan lines intermediate adjacent rows of correction values. Hence, the $\alpha$ values are accessed by means of a table look-up with "i" and "N" forming address inputs.

The 8 bit $\alpha$ value generated by memory 34 is applied to an inverter 48 and therefrom to the data inputs of a digital-to-analog converter 50. The value of $\alpha$ is simultaneously applied directly to the data inputs of a further digital-to-analog converter 52 such that converter 52 generates an analog representation of $\alpha$ while converter 50 generates an analog representation of $1-\alpha$.

Returning to the convergence circuitry 24, the analog values of $\alpha$ and $1-\alpha$ are applied to respective voltage reference inputs of digital-to-analog converters 38 and 40 respectively. Converters 38 and 40 are multiplying DACs for converting and then multiplying the respective pairs of convergence correction values (e.g. Xn, $S_2$ and Xn, $S_3$) by the weighting coefficients $\alpha$ and $1-\alpha$ respectively.

It has been discovered that by multiplying the 8 bit sample values retrieved from memory 22 by $\alpha$ (or $1-\alpha$) which itself is an analog conversion of an 8-bit digital value, the output from converters 38 and 40 corresponds to a greater than 8-bit accuracy for all values between sample points. In other words, converters 38 and 40 function as companding DACs yielding an equivalent accuracy of greater than 12-bits. As discussed above, the high accuracy of the correction values generated by the circuitry of the present invention results in elimination of "basket weaving" artifacts.

The analog outputs from converters 38 and 40 are summed via a summing circuit 54 and then output via a raster size multiplier circuit 56 to the appropriate horizontal or vertical convergence amplifier and correction coil.

As discussed above, the weighting coefficient values $\alpha$ and $1-\alpha$ are simultaneously applied to the voltage reference inputs of the digital-to-analog converters 38 and 40 for each of the six convergence correction circuits 24. Thus, the weighting coefficient generating circuitry is not required to be repeated for each of the circuits 24.

Additional latches 58, 60 and 62 are provided for addressing memory 22 via the address inputs thereof and storing user-defined correction values therein via the data inputs thereof, in a well known manner.

In summary, the circuitry of FIG. 2 provides up to nine stored lines $S_1$-$S_9$ of 128 correction values per line, thereby defining eight convergence correction zones. The circuitry generates correction values for every scan line (i) between the stored scan lines $S_1, S_2 \ldots S_9$. The generated correction values are synthesized to greater than 12-bit resolution by vertical interpolation. Furthermore, in accordance with the present invention, complete storage for both horizontal and vertical correction values is provided for all colours (e.g. red, green and blue) requiring a total of only 12K bytes of SRAM (i.e. six 2K×8-bit RAMs 22).

Figure 3A:
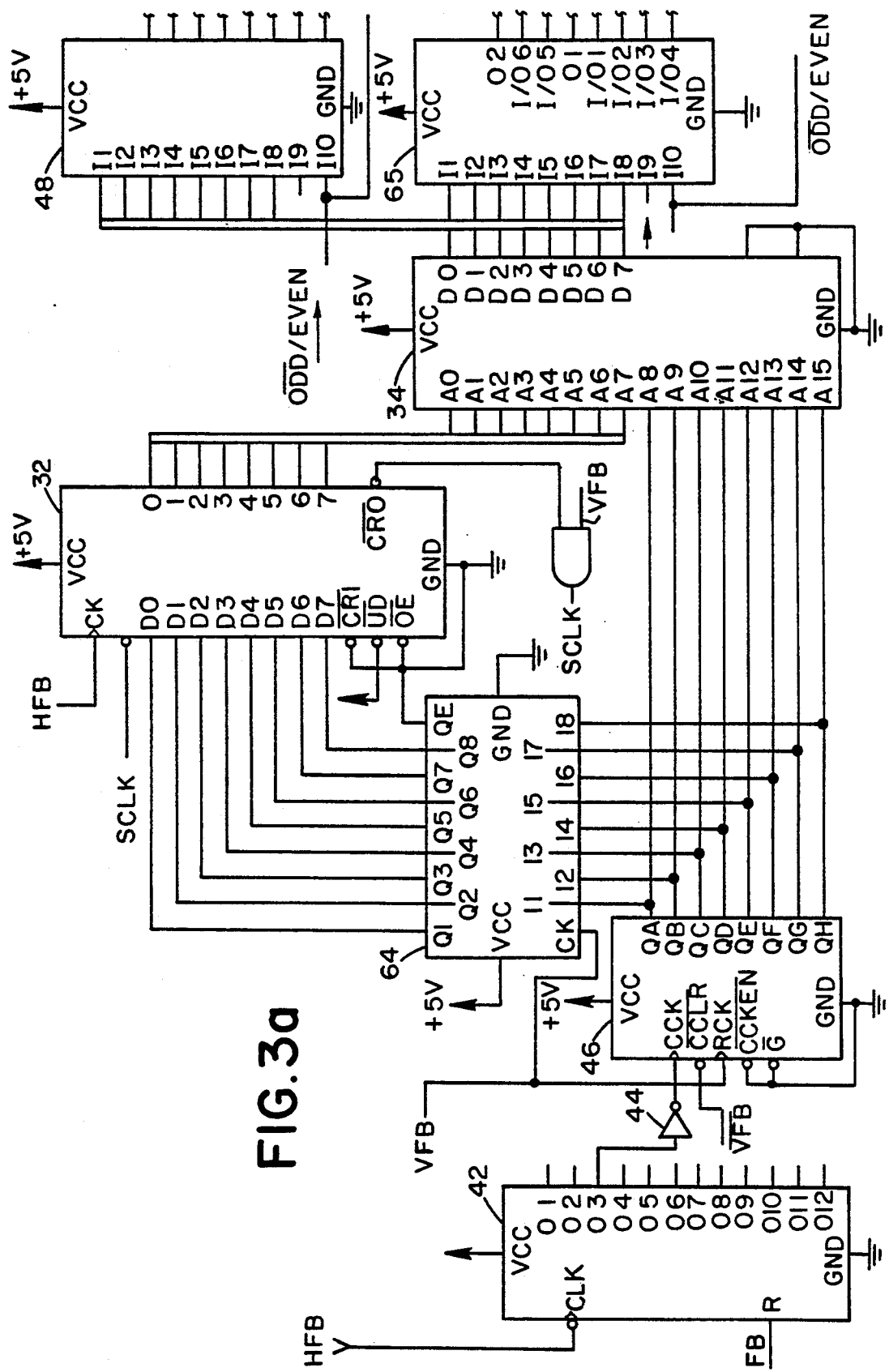

Turning to FIG. 3, a detailed schematic diagram is shown illustrating the circuitry for generating weighting coefficient values $\alpha$ and $1-\alpha$ in accordance with the preferred embodiment.

In operation, the HFB pulse is applied to a clock input of counter 42, which as discussed above with reference to FIG. 2, has the Q3 output thereof connected via an inverter 44 to the clock input of additional counter 46. Counter 46 receives the VFB timing pulse signal and in response generates a value N on the outputs Qa-Qh thereof.

The value N is applied to inputs I1-I8 of a programmable array logic circuit (PAL TM) designated as 64. PAL TM 64 receives VFB signal as a clock input thereof and in response converts the value N to N−1 via well known internal programmed logic circuitry, and applies the value N−1 to the Q1–Q8 outputs thereof for further application to the data inputs D0–D7 of counter 32.

Counter 32 is a down counter for receiving the HFB signal on a clock input thereof and in response generating successive descending address signals "i" corresponding to each scan line per zone.

The 8-bit address values "N" and "i" are applied to the address inputs A0–A15 of EPROM 34 for accessing corresponding weighting coefficient values as discussed above with reference to FIG. 2. The weighting coefficient values $\alpha$ appear on data terminals D0–D7 of EPROM 34 and are applied therefrom to data inputs I1–I8 of respective PAL TM circuits 48 and 65 for performing EXCLUSIVE OR logic operations on the data bits comprising the weighting coefficient, as discussed in greater detail below. Circuit 48 operates further to invert the $\alpha$ value and in response generating the inverted value $1-\alpha$.

The digital values of $\alpha$ and $1-\alpha$ are transmitted from the data outputs of PAL TM circuits 65 and 48 to data inputs D0–D7 of respective digital-to-analog converters 52 and 50.

Digital-to-analog converters 50 and 52 generate differential analog output signals responsive to receipt of the digital $\alpha$ and $1-\alpha$ correction values for application to analog amplifier circuits 67 and 69. Circuits 67 and 69 each comprise a plurality of differential amplifiers and associated gain and offset circuitry configured in a well known manner. The analog signals representing $\alpha$ and $1-\alpha$ are then applied to the respective voltage reference inputs of multiplying digital-to-analog converters 38 and 40, as discussed above with reference to FIG. 2.

The EXCLUSIVE OR operation performed by PAL TM circuits 65 and 48 is required to ensure that, for each zone (i.e. pair of scan lines for which correction values are stored), one of the converters 50 or 52 will retain the stored correction value which is common to the adjacent scanned pair of zones. This effectively overcomes non-linearities inherent in the digital-to-analog converters which could otherwise result in a different analog representation of $\alpha$ for the same digital value generated by EPROM 34 when different ones of the converters 50 and 52 are used to process the same digital $\alpha$ value for different convergence zones.

FIG. 4 illustrates a circuit for shortening the vertical fly-back pulse (VIDEO VFB) which is generated by the video display system, in accordance with an additional aspect of the preferred embodiment.

In a typical video display system, the blanking period during which the electron beam goes from the bottom to the top of the screen is approximately 300 microseconds to 350 microseconds and normally includes a small number of horizontal scan lines while the beam is retracing. As discussed above, counters 42 and 46 operate to count the number of scan lines "N" per convergence zone. According to the preferred embodiment, counter 42 operates as a divide-by-eight counter. Accordingly, for one raster scan, (i.e. period between successive VFB pulses), up to seven scan lines can be missed (i.e. not counted by counter 42).

Thus, the circuit of FIG. 4 receives the standard VIDEO VFB pulse from the video display system, conditions the pulse via a buffer 71 and applies the level adjusted signal to the B input of a flip-flop 73. The flip-flop 73 incorporates time delay circuitry in the form of an RC network comprised of resistor 75 and capacitor 77 such that the output Q of the flip-flop generates a modified VFB pulse which is shortened with respect to VIDEO VFB in order that all of the raster scan lines can be counted between successive VFB pulses.

In other words, instead of counting the entire number of scan lines in the active raster as defined by the normal VIDEO VFB pulse, the modified VFB pulse provided by the circuitry of FIG. 4 results in a retrace time which is reduced to less than one scan line in order that all scan lines are counted, even though not all scan lines necessarily show up on the screen. This effectively eliminates any discontinuity resulting from an inaccurate calculation of the value N.

In summary, according to the present invention, a digital convergence system is provided for generating convergence correction values at each scan line of an entire raster for overcoming line pairing artifacts which are generated in prior art convergence systems in which the number of correction values is less than the entire number of scan lines. Circuitry is provided in the present invention for counting the number of scan lines per convergence zone for various frequencies of operation and in response generating interpolated correction values for each scan line per zone. Accordingly, the convergence system of the present invention is independent of operating frequency. Furthermore, the generated convergence correction values are of approximately 12-bit accuracy, thereby overcoming the "basket weaving" artifact common in prior art systems.

Other embodiments or variations of the present invention are possible.

For example, the circuitry may be modified to incorporate fewer or greater than eight convergence correction zones or fewer or greater than 128 correction values per scan line as provided by the preferred embodiment.

Also, the circuitry of the present invention may be applied to laser projection, CRT, LCD, or other video applications requiring convergence of video images, or the production of any two-dimensional correction waveform.

In addition, circuit 24, embodying the interpolation equation, could be realized by entirely digital means employing parallel digital multipliers and accumulator registers.

Furthermore, EPROM 34 may be realized by any sort of random access memory device.

All such modifications or variations are believed to be within the sphere and scope of the present invention as defined by the claims appended hereto.

I claim:

1. In a scanning rate correction apparatus for generating interpolated correction values intermediate a pair of user-defined correction values associated with respective predetermined scan lines of a video display system, the improvement comprising:
    (a) means for detecting the number (N) of successive scan lines (i) between said respective predetermined scan lines;
    (b) means for generating a pair of weighting coefficients having values of $\alpha = i/N$ and $1-\alpha = 1-i/N$, respectively, for each said successive scan lines (i);
    (c) first means for multiplying a first one of said pair of user-defined correction values by a first one of said pair of weighting coefficients ($\alpha$) for each said successive scan lines (i) and in response generating successive first product values;

(d) second means for multiplying the other of said pair of user-defined correction values by the other of said pair of weighting coefficients $(1-\alpha)$ for each said successive scan lines (i), and in response generating successive second product values; and (e) means for summing said successive first and second respective product values and in response generating said interpolated correction values for each said successive scan lines (i).

2. The improvement of claim 1, wherein said means for generating further comprises:

(a) memory means for storing a plurality of values of said first one of said pair of weighting coefficients ($\alpha$) corresponding to different values of i and N, said memory means being addressed by said values of i and N to generate said plurality values of said first one of said pair of weighting coefficients ($\alpha$); and (b) inverter means for inverting said plurality of values of said first one of said pair of weighting coefficients ($\alpha$) generated by said memory means, and in response generating various corresponding values of said other one of said pair of weighting coefficients $(1-\alpha)$.

3. The improvement of claim 2, wherein said means for detecting further comprises:

(a) means for counting the total number of said scan lines per raster of said video display system; and (b) means for dividing said total number of said scan lines by the total number of said respective predetermined scan lines per raster of said video display system, and in response generating said number (N) of successive scan lines (i).

4. The improvement of claim 1, wherein said means for generating further comprises a 64K EPROM for storing 256 of said weighting coefficients ($\alpha$) for each said pair of user-defined correction values.

5. The improvement of claim 1, wherein said first means and said second means are multiplying digital-to-analog converters.

6. In a video display system including circuitry for generating a vertical timing pulse signal and a horizontal timing pulse signal, a digital convergence circuit comprising:

(a) vertical address generator means for receiving said vertical timing pulse signal and in response generating successive pairs of vertical address signals;

(b) horizontal address generator means for receiving said horizontal timing pulse signal and in response generating successive horizontal address signals;

(c) first memory means for receiving said successive pairs of vertical address signals and said successive horizontal address signals and in response generating successive pairs of user-defined convergence correction signals associated with respective horizontal adjustment points on predetermined scan lines of said video display system;

(d) means for detecting the number (N) of successive scan lines (i) between successive ones of said predetermined scan lines, and in response generating a further address signal representative thereof;

(e) further address generator means for generating successive count address signals representing said successive scan lines (i);

(f) second memory means for receiving said further address signal and said successive count address signals and in response generating successive pairs of weighting coefficient signals having values of $\alpha=i/N$ and $1-\alpha=1-i/N$ respectively, for successive ones of said count address signals;

(g) first converter means for multiplying successive first ones of said pairs of user-defined convergence correction signals by respective first ones of said pairs of weighting coefficient signals ($\alpha$) and in response generating successive first product signals;

(h) second converter means for multiplying successive second ones of said pairs of user-defined convergence correction signals by respective second ones of said pairs of weighting coefficient signals $(1-\alpha)$ and in response generating successive second product signals; and (i) means for summing said successive first product signals with said successive second product signals and in response generating interpolated convergence correction signals for each said successive scan lines (i).

7. A digital convergence circuit as defined in claim 6, wherein said vertical address generator means comprises first and second counters for generating first and second count signals in accordance with said vertical timing pulse signal generated by said video display system, said first and second counters being preset to initial count values of zero and one respectively, and a multiplexer for alternately receiving said first and second count signals and in response generating said successive pairs of vertical address signals.

8. A digital convergence circuit as defined in claim 6, wherein said horizontal address generator means comprises a counter for generating said successive horizontal address signals in accordance with said horizontal timing pulse signal generated by said video display system.

9. A digital convergence circuit as defined in claim 6, wherein said first memory means comprises a RAM circuit for storing said user-defined convergence correction signals.

10. A digital convergence circuit as defined in claim 6, wherein said means for detecting further comprises:

(a) means for counting the total number of said scan lines per raster of said video display system; and (b) means for dividing said total number of said scan lines by the total number of said respective predetermined scan lines per raster of said video display system, and in response generating said number (N) of successive scan lines (i).

11. A digital convergence circuit as defined in claim 8, wherein said further address generator means comprises a down counter for receiving said horizontal timing pulse and successively counting down from said number (N) of successive scan lines (i) to zero and in response generating said successive count address signals.

12. A digital convergence circuit as defined in claim 6, wherein said second memory means comprises an EPROM for storing said weighting coefficient signals.

13. A digital convergence circuit as defined in claim 6, wherein said first and second converter means are multiplying digital-to-analog converters.

14. In an interpolation circuit for multiplying first and second predetermined convergence correction values corresponding to a pair of sample points by a plurality of respective first and second weighting coefficient values corresponding to successive additional sample points (i) intermediate said first and second sample points, a circuit for generating said weighting coefficient values comprising:

(a) means for detecting the number (N) of said successive additional sample points (i), and in response generating a first address signal representative thereof;

(b) means for generating successive count address signals corresponding to said successive additional sample points (i);

(c) memory means for receiving said first and successive count address signals and in response generating respective ones of said first weighting coefficient values $\alpha$ in accordance with the relation $\alpha = i/N$; and (d) means for receiving and inverting said respective ones of said first weighting coefficient values $\alpha$ and in response generating respective ones of said second weighting coefficient values in accordance with the relation $1 - \alpha = 1 - i/N$, whereby a distinct convergence correction value is generated for each said sample points (i) intermediate said first and second sample points.

15. A circuit as defined in claim 14, wherein said means for detecting further comprises:

(a) means for counting the total number of said scan lines per raster of said video display system; and (b) means for dividing said total number of said scan lines by the total number of said respective predetermined scan lines per raster of said video display system, and in response generating said number (n) of successive scan lines (i).

16. A circuit as defined in claim 14, wherein said means for generating comprises a down counter for receiving said horizontal timing pulse and successively counting down from said number (N) of successive scan lines (i) to zero and in response generating said successive count address signals.

17. A circuit as defined in claim 14, wherein said memory means comprises an EPROM for storing weighting coefficient signals.

18. A circuit as defined in claim 17, wherein said EPROM is a 64K×8-bit EPROM for storing 256 of said first weighting coefficient values $\alpha$ for each of 256 possible numbers (N) of said additional sample points (i).

19. A circuit as defined in claim 10, further comprising means for calibrating said vertical timing pulse signal to ensure that each of said scan lines is counted per raster by said means for detecting.

* * * * *